US007324133B2

(12) United States Patent
Steinberg et al.

(10) Patent No.: US 7,324,133 B2
(45) Date of Patent: Jan. 29, 2008

(54) METHOD AND APPARATUS FOR CONTROLLED CAMERA USEABILITY

(75) Inventors: Eran Steinberg, San Francisco, CA (US); Yury Prilutsky, San Mateo, CA (US)

(73) Assignee: FotoMedia Technologies, LLC, Portsmouth, NH (US)

( * ) Notice: Subject to any disclaimer, the term of this patent is extended or adjusted under 35 U.S.C. 154(b) by 694 days.

(21) Appl. No.: 10/346,446

(22) Filed: Jan. 15, 2003

(65) Prior Publication Data

US 2003/0169342 A1    Sep. 11, 2003

Related U.S. Application Data

(63) Continuation of application No. 09/187,706, filed on Nov. 6, 1998, now abandoned.

(51) Int. Cl.
*H04N 5/225*    (2006.01)
(52) U.S. Cl. .................. 348/207.99; 348/161
(58) Field of Classification Search ............... 348/372, 348/161, 552, 333.06, 207.99; 382/116; 396/6, 311, 378
See application file for complete search history.

(56) References Cited

U.S. PATENT DOCUMENTS

| | | | |
|---|---|---|---|
| 4,148,372 A | 4/1979 | Schroeder | 180/114 |
| 4,458,142 A | 7/1984 | Bernstein | |
| 4,714,962 A | 12/1987 | Levine | |
| 4,835,563 A | 5/1989 | Larish | |
| 4,853,733 A | 8/1989 | Watanabe et al. | |
| 5,003,399 A | 3/1991 | Ishimaru et al. | |
| 5,021,811 A * | 6/1991 | Maurinus et al. | 396/6 |
| 5,027,401 A | 6/1991 | Soltesz | |

(Continued)

FOREIGN PATENT DOCUMENTS

EP    0756225    1/1997

(Continued)

OTHER PUBLICATIONS

Early, et al., The VideoPhone 2500—Video Telephony on the Public Switched Telephone Network, 1993, AT&T Technical Journal, pp. 22-23.

(Continued)

*Primary Examiner*—Lin Ye

(57) ABSTRACT

A programmable digital camera requiring a programming password to be entered to access the camera's programmability. The camera further includes programming so as to allow the camera to be operated only for a specified time interval, after which the camera becomes inoperable until the programming password is again entered and the camera is programmed to operate for another interval of time. An alternate embodiment of the invention includes a programmable digital camera as above described wherein the camera is programmed to only capture a set number of images, at which point the programming password must again be entered and the camera reset for another quantity of images. A further alternate embodiment includes a camera system with a separate transmitter for radiating a signal designed to cover a designated area, the signal being modulated with a camera operational code. The camera is equipped with a corresponding receiver and demodulator to receive the operational code. The camera is programmed to check for the operational code periodically, and if the code is not received, the camera automatically shuts down, thereby limiting operation of the camera to the designated area.

22 Claims, 6 Drawing Sheets

U.S. PATENT DOCUMENTS

| | | | |
|---|---|---|---|
| 5,036,344 A | 7/1991 | Inoue et al. | |
| 5,124,814 A | 6/1992 | Takahashi et al. | |
| 5,138,459 A | 8/1992 | Roberts et al. | |
| 5,150,407 A | 9/1992 | Chan | |
| 5,153,729 A * | 10/1992 | Saito | 348/231.6 |
| 5,164,836 A | 11/1992 | Jackson et al. | |
| 5,182,635 A | 1/1993 | Nakashima et al. | |
| 5,184,169 A | 2/1993 | Nishitani | |
| 5,198,851 A | 3/1993 | Ogawa | |
| 5,220,366 A | 6/1993 | King | |
| 5,231,501 A | 7/1993 | Sakai | |
| 5,260,735 A | 11/1993 | Ishikawa et al. | |
| 5,260,795 A | 11/1993 | Sakai et al. | |
| 5,272,025 A | 12/1993 | Wheeler | |
| 5,303,050 A | 4/1994 | Nishimura et al. | |
| 5,307,100 A | 4/1994 | Kubo | |
| 5,325,430 A | 6/1994 | Smyth et al. | |
| 5,383,027 A | 1/1995 | Harvey et al. | |
| 5,389,989 A | 2/1995 | Hawkins et al. | |
| 5,392,356 A | 2/1995 | Konno et al. | 380/23 |
| 5,396,546 A | 3/1995 | Remillard | |
| 5,404,463 A | 4/1995 | McGarvey | |
| 5,416,510 A | 5/1995 | Lipton et al. | |
| 5,418,585 A * | 5/1995 | Petruchik et al. | 396/6 |
| 5,428,685 A | 6/1995 | Kadooka et al. | |
| 5,432,871 A | 7/1995 | Novik | |
| 5,442,704 A | 8/1995 | Holtey | |
| 5,442,706 A | 8/1995 | Kung | |
| 5,444,483 A | 8/1995 | Maeda | |
| 5,446,491 A | 8/1995 | Shibata et al. | |
| 5,467,396 A | 11/1995 | Schossow et al. | |
| 5,475,441 A | 12/1995 | Parulski et al. | |
| 5,477,264 A | 12/1995 | Sarbadhikari et al. | 348/231 |
| 5,477,542 A | 12/1995 | Takahara et al. | |
| 5,485,284 A | 1/1996 | Shono et al. | |
| 5,499,294 A * | 3/1996 | Friedman | 713/179 |
| 5,517,569 A | 5/1996 | Clark | |
| 5,524,194 A | 6/1996 | Chida et al. | |
| 5,543,885 A | 8/1996 | Yamano et al. | |
| 5,550,646 A | 8/1996 | Hassan et al. | |
| 5,568,192 A | 10/1996 | Hannah | |
| 5,577,107 A | 11/1996 | Inagaki | 379/96 |
| 5,581,613 A | 12/1996 | Nagashima et al. | |
| 5,594,319 A | 1/1997 | Thandiwe | 320/2 |
| 5,594,736 A | 1/1997 | Tatsumi et al. | 370/474 |
| 5,606,361 A | 2/1997 | Davidsohn et al. | |
| 5,606,365 A | 2/1997 | Maurinus et al. | |
| 5,623,637 A | 4/1997 | Jones et al. | |
| 5,625,410 A | 4/1997 | Washino et al. | 348/154 |
| 5,633,678 A | 5/1997 | Parulski et al. | |
| 5,636,209 A | 6/1997 | Perlman | |
| 5,642,135 A | 6/1997 | Noguchi et al. | |
| 5,642,401 A | 6/1997 | Yahagi | |
| 5,650,861 A | 7/1997 | Nakajima et al. | |
| 5,666,159 A | 9/1997 | Parulski et al. | |
| 5,666,516 A | 9/1997 | Combs | |
| 5,668,876 A | 9/1997 | Falk et al. | |
| 5,674,003 A | 10/1997 | Andersen et al. | 364/514 |
| 5,675,003 A | 10/1997 | Park et al. | 540/225 |
| 5,677,953 A | 10/1997 | Dolphin | |
| 5,689,563 A | 11/1997 | Brown et al. | |
| 5,696,850 A | 12/1997 | Parulski et al. | |
| 5,708,856 A | 1/1998 | Cloutier | 320/2 |
| 5,715,487 A * | 2/1998 | McIntyre et al. | 396/299 |
| 5,737,491 A | 4/1998 | Allen et al. | |
| 5,748,744 A | 5/1998 | Levy et al. | |
| 5,748,763 A | 5/1998 | Rhoads | |
| 5,748,898 A | 5/1998 | Ueda | |
| 5,751,271 A | 5/1998 | Anstotz et al. | |
| 5,751,809 A | 5/1998 | Davis et al. | |
| 5,752,085 A | 5/1998 | Cloutier et al. | 396/6 |
| 5,754,227 A | 5/1998 | Fukuoka | 348/232 |
| 5,768,426 A | 6/1998 | Rhoads | |
| 5,784,581 A | 7/1998 | Hannah | |
| 5,801,856 A | 9/1998 | Moghadam et al. | |
| 5,814,798 A | 9/1998 | Zancho | |
| 5,815,577 A | 9/1998 | Clark | |
| 5,825,408 A | 10/1998 | Yuyama et al. | |
| 5,835,140 A | 11/1998 | Nakamura et al. | |
| 5,839,119 A | 11/1998 | Krsul et al. | |
| 5,852,472 A | 12/1998 | Prasad et al. | |
| 5,861,918 A | 1/1999 | Anderson et al. | 348/233 |
| 5,862,217 A | 1/1999 | Steinberg et al. | 280/10 |
| 5,862,218 A | 1/1999 | Steinberg | |
| 5,862,325 A | 1/1999 | Reed et al. | |
| 5,870,207 A | 2/1999 | Kamimoto et al. | |
| 5,878,142 A | 3/1999 | Caputo et al. | |
| 5,878,283 A * | 3/1999 | House et al. | 396/6 |
| 5,880,770 A | 3/1999 | Ilcisin et al. | |
| 5,893,037 A | 4/1999 | Reele et al. | |
| 5,896,128 A | 4/1999 | Boyer | 345/327 |
| 5,898,779 A | 4/1999 | Squilla et al. | |
| 5,903,216 A | 5/1999 | Sutsos et al. | 340/542 |
| 5,905,528 A | 5/1999 | Kodama | |
| 5,917,542 A | 6/1999 | Moghadam et al. | |
| 5,943,046 A | 8/1999 | Cave et al. | |
| 5,974,150 A | 10/1999 | Kaish et al. | 380/25 |
| 5,987,136 A | 11/1999 | Schipper et al. | |
| 5,991,842 A | 11/1999 | Takayama | |
| 6,002,770 A | 12/1999 | Tomko et al. | |
| 6,006,039 A | 12/1999 | Steinberg et al. | 396/57 |
| 6,023,292 A | 2/2000 | Wakui | |
| 6,046,762 A | 4/2000 | Sonesh et al. | |
| 6,049,621 A | 4/2000 | Jain et al. | |
| 6,052,509 A | 4/2000 | Abe | |
| 6,073,192 A | 6/2000 | Clapp et al. | |
| 6,129,273 A | 10/2000 | Shah | 235/380 |
| 6,161,122 A | 12/2000 | Hawkes | |
| 6,204,877 B1 | 3/2001 | Kiyokawa | |
| 6,256,453 B1 * | 7/2001 | Takano | 386/126 |
| 6,266,082 B1 | 7/2001 | Yonezawa et al. | |
| 6,344,875 B1 | 2/2002 | Hashimoto et al. | |
| 6,351,745 B1 | 2/2002 | Itakura et al. | |
| 6,381,513 B1 | 4/2002 | Takase et al. | 700/231 |
| 6,400,824 B1 * | 6/2002 | Mansoorian et al. | 380/269 |
| 6,433,818 B1 * | 8/2002 | Steinberg et al. | 348/161 |
| 6,480,671 B2 | 11/2002 | Takahashi et al. | |
| 6,567,121 B1 | 5/2003 | Kuno | |
| 6,833,861 B2 | 12/2004 | Matsumoto et al. | |
| 2001/0010543 A1 | 8/2001 | Ward et al. | |
| 2001/0043272 A1 | 11/2001 | Sato et al. | |
| 2002/0101816 A1 | 8/2002 | Braitberg et al. | |

FOREIGN PATENT DOCUMENTS

| | | |
|---|---|---|
| EP | 0889635 | 1/1999 |
| GB | 2289555 | 11/1995 |
| JP | 09-233453 | 9/1997 |
| WO | WO 9730375 A1 * | 8/1997 |
| WO | WO 97-36426 | 10/1997 |

OTHER PUBLICATIONS

"FlashPath SmartMedia Card Floppy Disk Adapter," Product Description, PC Mall [internet publication] URL: http://www.pcmall.com/pcmall/shop/detail.asp?d-pno=210863.

JP 05-083435 (Konica Corp), (abstract), Apr. 2, 1993. In: Patent Abstracts of Japan [online].

JP-10-051721 (Ricoh Co Ltd), abstract, Feb. 20, 1998. In: Patent Abstracts of Japan [online].

JP-09-322114 (Fuji Photo Film Co Ltd), abstract, Dec. 12, 1997. In: Patent Abstracts of Japan [online].

JP-08-228321 (Ricoh Co Ltd), abstract, Sep. 3, 1996 In: Patent Abstracts of Japan [online].

JP-07-184176 (Sharp Corp), abstract, Jul. 21, 1995 In: Patent Abstracts of Japan [online].

JP-10-105658 (Matsushita Electric Ind Co Ltd), abstract, Apr. 24, 1998 In: Patent Abstracts of Japan [online].

JP-08-102837 (Matsushita Electric Ind Co Ltd), abstract, Apr. 16, 1996 In: Patent Abstracts of Japan [online].

JP-09-149315 (Asahi Optical Co Ltd), abstract, Jun. 6, 1997 In: Patent Abstracts of Japan [online].

JP-05-030247 (Fuji Xerox Co Ltd), abstract, Feb. 5, 1993 In: Patent Abstracts of Japan [online].

* cited by examiner

METHOD AND APPARATUS FOR CONTROLLED CAMERA USEABILITY

CROSS-RELATED APPLICATIONS

This application is a Continuation application of U.S. patent application Ser. No. 09/187,706, titled "Method and Apparatus for Controlled Camera Useability" (Attorney Docket No. FN008), filed on Nov. 6,1998, now abandoned.

BACKGROUND OF THE INVENTION

1. Field of the Invention

The present invention relates generally to digital cameras, and more particularly to a method and apparatus for eliminating unauthorized use of a camera, and for deterring camera theft by programming the camera to operate only under predetermined conditions.

2. Description of the Prior Art

Digital cameras prior to the present invention have not been configured to prevent unauthorized use or discourage theft. In the area of film-based cameras, a mechanical apparatus for discouraging unauthorized use of a rental camera is disclosed in U.S. Pat. No. 5,708,856 by Cloutier. It involves requiring the removal of a locking screw prior to loading or unloading film, a process which appears to make it more difficult, but not impossible for a borrower to remove and replace film. In commercial or industrial facilities of various kinds, numerous expensive digital cameras are in use. Due to the small size and general applicability of present digital cameras, unauthorized use and theft are matters for concern. Similarly, in the case of rental cameras, some means for encouraging the return of a digital rental camera is needed, as well as a means for limiting the use of a camera, for example to a predetermined time interval, or a fixed number of images according to a rental agreement. In the case where a digital camera is used for business purposes, the company needs a way of discouraging workers from using company cameras for non-work related purposes.

SUMMARY OF THE INVENTION

It is therefore an object of the present invention to provide a digital camera system with theft protection.

It is a further object of the present invention to provide a digital camera that cannot be used remotely from a designated area.

It is a still further object of the present invention to provide a digital camera that can be operated by a user for only a predetermined time interval.

It is another object of the present invention to provide a digital camera that a user can only operate to capture a predetermined number of images.

It is an object of the present invention to provide a rental digital camera that automatically encrypts captured images, that can only be viewed by a renter after returning the camera to the lender for decryption.

Briefly, a preferred embodiment of the present invention includes a programmable digital camera requiring a programming password to be entered to access the camera's programmability. The camera further includes programming so as to allow the camera to be operated only for a specified time interval, after which the camera becomes inoperable until the programming password is again entered and the camera is programmed to operate for another interval of time. An alternate embodiment of the invention includes a programmable digital camera as above described wherein the camera is programmed to only capture a set number of images, at which point the programming password must again be entered and the camera reset for another quantity of images. A further alternate embodiment includes a camera system with a separate transmitter for radiating a signal designed to cover a designated area, the signal being modulated with a camera operational code. The camera is equipped with a corresponding receiver and demodulator to receive the operational code. The camera is programmed to check for the operational code periodically, and if the code is not received, the camera automatically shuts down, thereby limiting operation of the camera to the designated area.

An advantage of the present invention is that it provides protection against theft by rendering a camera inoperable by an unauthorized user.

A further advantage of the present invention is that it provides a lender the ability to restrict the use of a rental camera to a fixed number of images, thereby encouraging the return of the camera.

A still further advantage of the present invention is that it provides a lender the ability to restrict the use of a rental camera to a fixed time period.

Another advantage of the present invention is that it provides a camera that can only be used in a specific physical area.

A still further advantage of the present invention is that it provides a camera that can be restricted in use to an office, and thereby avoid its use for recreational purposes.

DETAILED DESCRIPTION OF THE PREFERRED EMBODIMENTS

Figure 1:
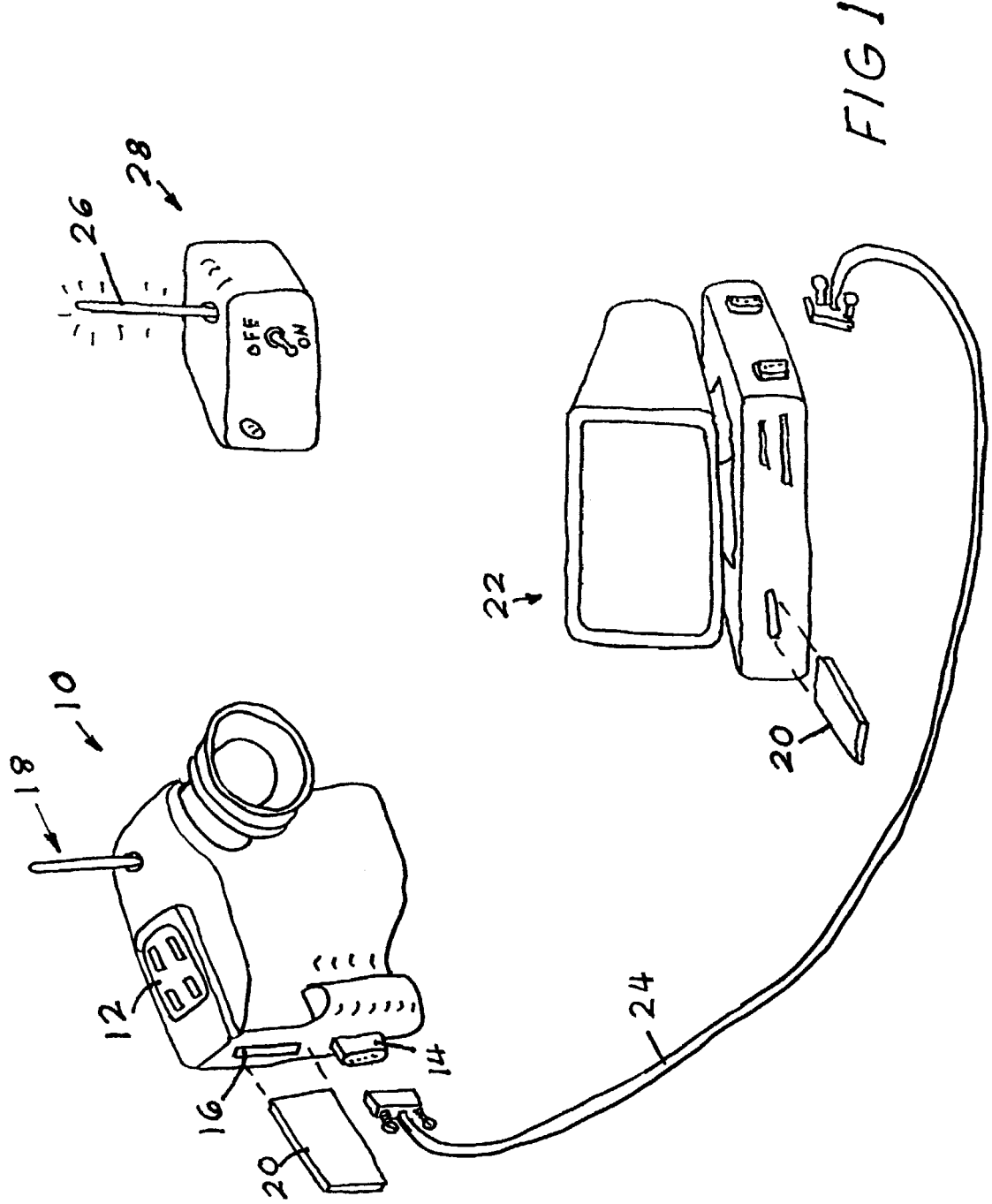
FIG. 1 illustrates the apparatus of the various embodiments of the present invention.

Referring now to FIG. 1 of the drawing, there is an illustration of the apparatus of the preferred embodiments of the present invention. A digital camera 10 includes at least one of four programming inputs, including a keypad 12, a connector 14, a card input 16, and an antenna. In the case where the card input 16 is used, a card 20 is a key part of the invention, containing the novel data for the camera. Alternatively, the card has a processor and memory for use in a camera and card operable combination. The connector if used for input, is typically connected to a computer system 22 through a cable 24 for programming the camera 10.

The antenna 18 is for reception of modulated signals, such as radio frequency or infra-red, radiated from an antenna 26 of a transmitter 28, the modulation containing an operation code to begin operation of the camera 10, and a renewal code for continuing the camera operation. In one embodiment, the operational code and renewal code are the same. The details of the various embodiments will be fully described in the following specification in reference to the figures of the drawing.

Figure 2:
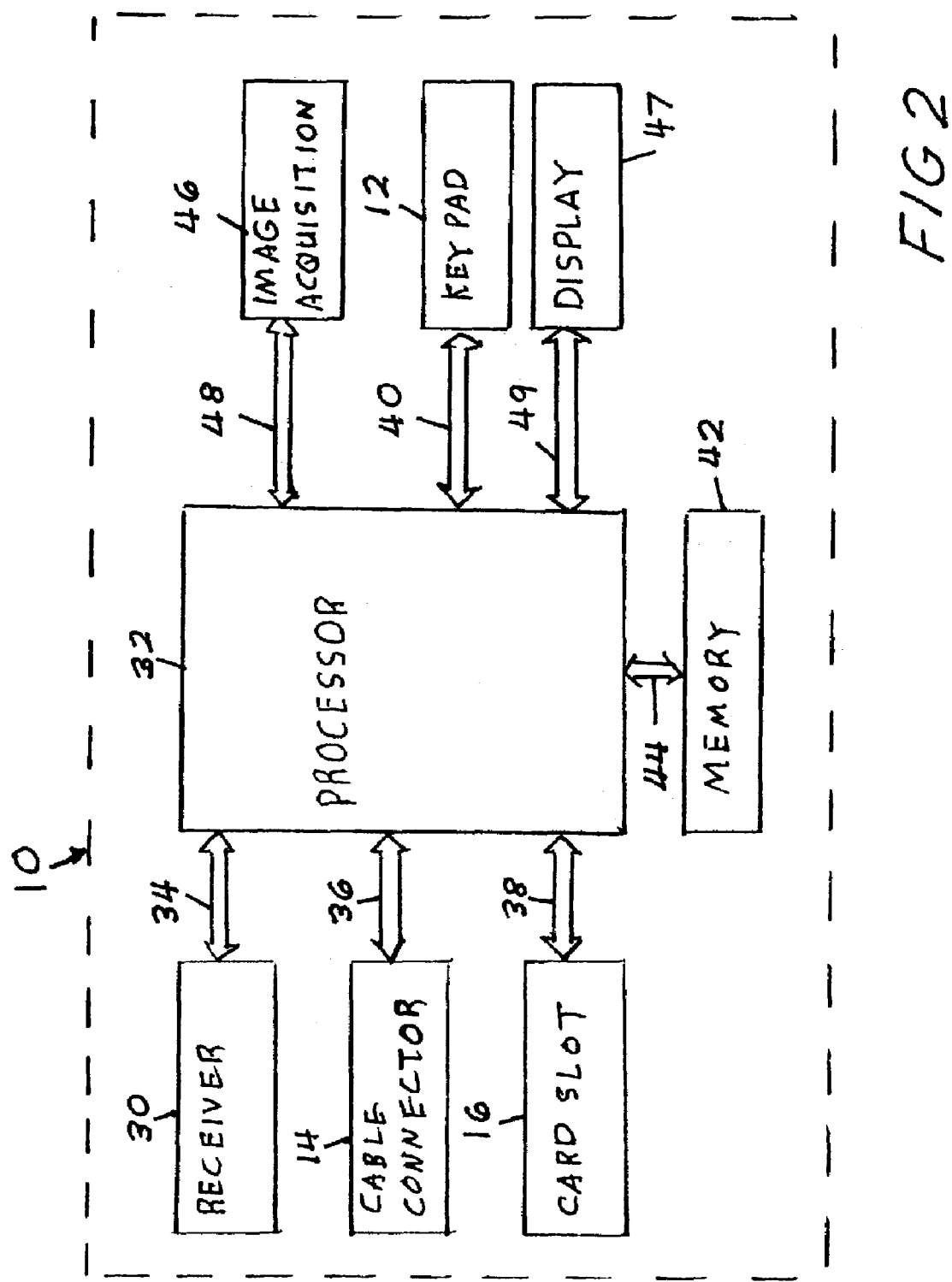
FIG. 2 is a block diagram of the major elements of the programmable camera of the present invention.

FIG. 2 illustrates the major components of the programmable digital camera 10 of the present invention. The camera 10 receives programming data and sends image data by way of one or more of the input or input/output elements including the keypad 12, the cable connector 414, card slot 16, or receiver 30 by way of antenna 18 of FIG. 1. The input/outputs 12, 14, 16, 30 pass programming data to a processor 32 through buses 34, 36, 38 and 40. Data and programming are stored in memory 42 connected to processor 32 through bus 44. The facility for acquisition of image data is indicated by image acquisition block 46 connected to the processor 32 through bus 48. The display 47, connected to processor 32 through bus 49, supplies visual information to the user. The specific items displayed are a matter of design choice, and the various options that will be apparent to those skilled in the art are included in the present invention. For example, one embodiment of the display shows the number of images allowed, and the number unused/remaining. Another embodiment wherein the camera or card is pre-programmed to allow operation for a specified time, includes the display 47 indicating operability, for example showing the date and time of allowed use, and date and time of expiration of use, or if the allowance is simply for a total amount of operation time, the display 47 would show the total amount of allowed time remaining.

Figure 3:
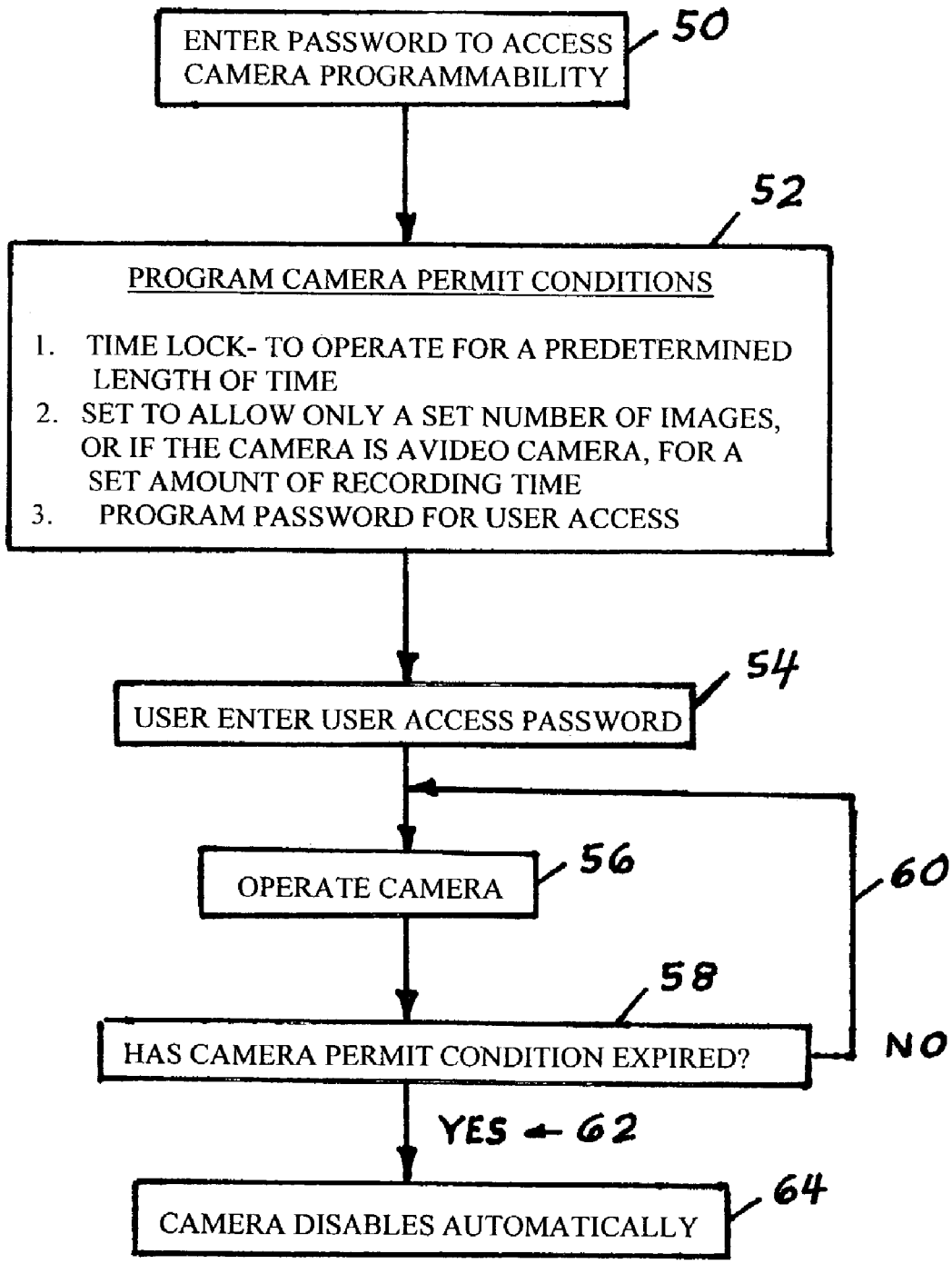
FIG. 3 is a flow chart of an embodiment wherein a lender can program the camera to Operate for a set time period or number of images.

A preferred embodiment of the present invention is illustrated in the flow chart of FIG. 3. This embodiment applies to situations wherein the camera "owner" has a need to restrict the use of the camera by a user. A preferred example of this is a camera rental situation. The camera is programmable, and requires entry of a programming password in order to access the camera programmability. This feature and the entry of a programming password is indicated by block 50. Block 52 lists programmable conditions that can be set by the owner, including a "time lock" which sets the camera to allow operation over a time span of a certain number of hours or days. Another option allows the owner to set the camera to capture only a specified number of images. Alternatively, if the digital camera is a digital video camera, the owner would set the camera to allow a fixed amount of recording time. The owner can also program a user access password to enable the use of the programmed camera. In operation, the user will then enter the access password (block 54) and operate the camera (block 56). The camera then keeps track of the permit condition i.e., elapsed time, or number of images or recording time, and if the condition is not expired, operation is allowed, as indicated by block 58 and path 60. If the permit condition is expired 62, the camera automatically disables image taking (block 64).

Figure 4:
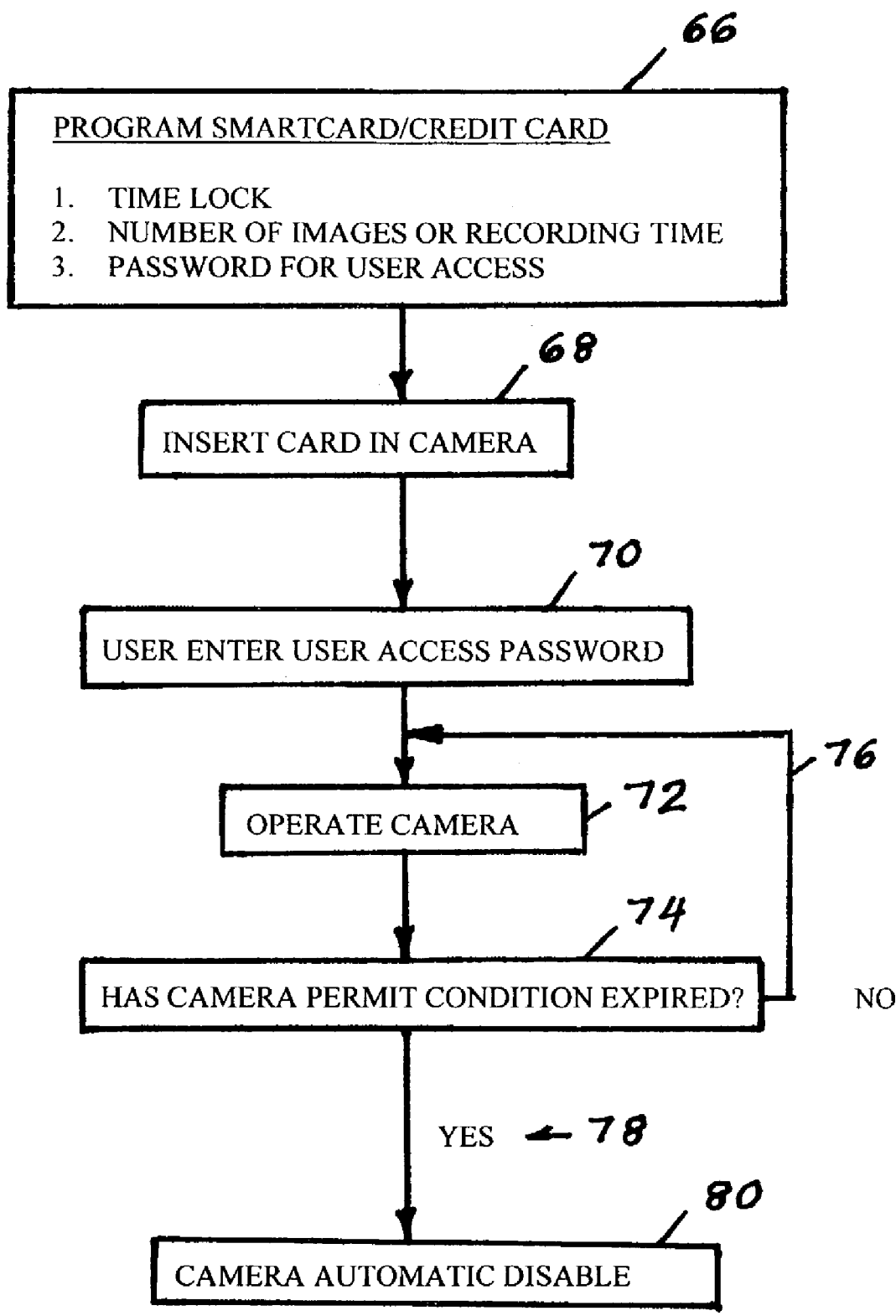
FIG. 4 is flow chart wherein the camera is programmed through use of a smart card.

FIG. 4 illustrates an alternative embodiment wherein the owner programs a Smart Card or credit card with the required data, including a time lock and/or number of images or recording time, and optionally a user access password (block 66). In operation, the Smart Card or credit card 20 (FIG. 1) is then inserted into the camera 10 receptacle 16 (block 68). Entering the user 13 password (block 70) is optional but is preferably implemented if the card 20 is an off-the-shelf 14 standard item. The descriptions and operations associated with item numbers 70-80 of FIG. 4 are operationally the same as for item numbers 54-64 of FIG. 3.

Figure 5:
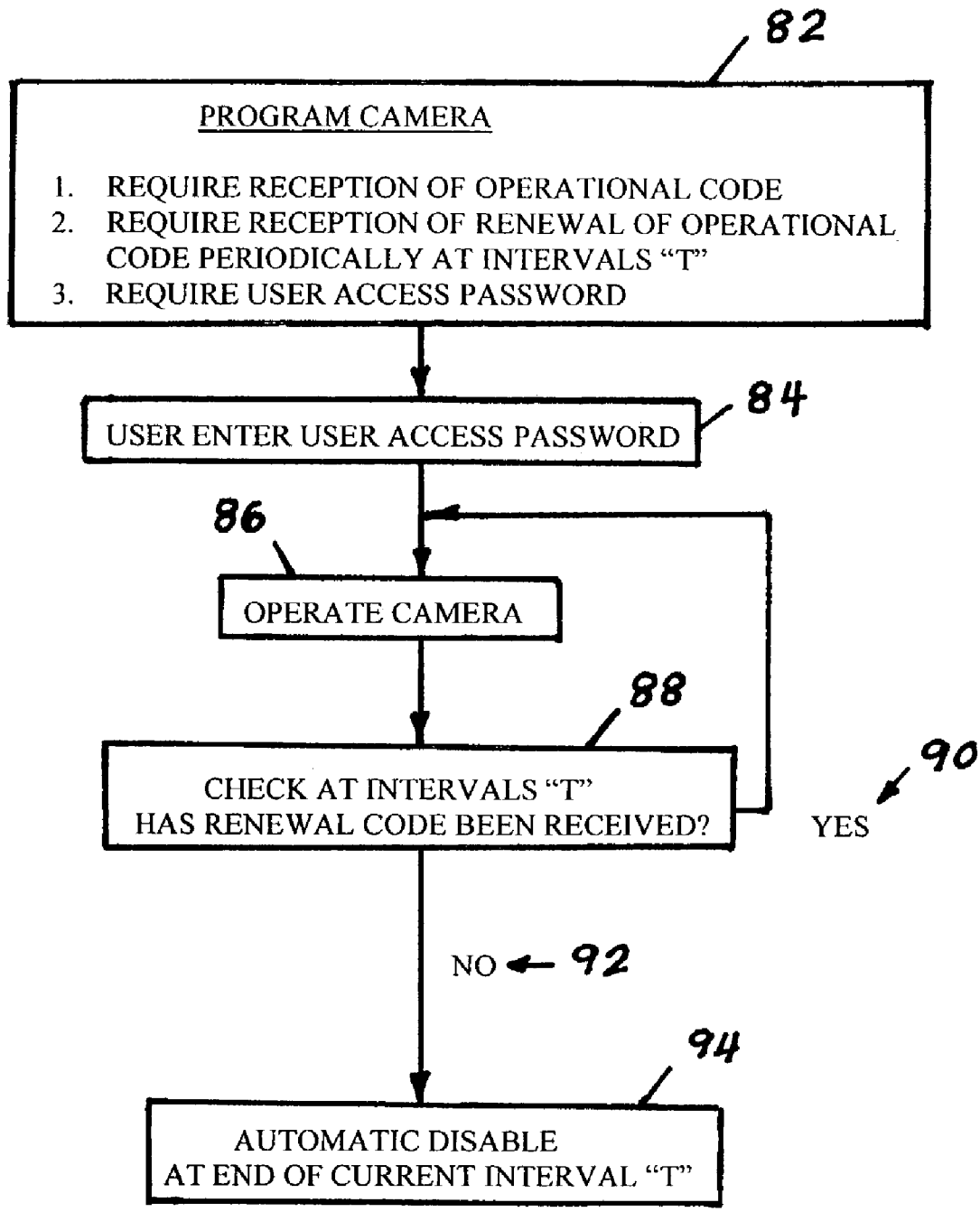
FIG. 5 illustrates the camera programming and operation in a system wherein the camera must detect a modulated, radiated signal in order to continue operation.

FIG. 5 presents an alternative embodiment that automatically renders the camera inoperable if it is removed from an authorized zone of operation. A typical application would be a factory in which a number of expensive digital cameras are used. Another example would be a tourist place such as a theme park. Referring to FIGS. 1 and 2, the camera in this embodiment includes a receiver 30 for reception of a signal radiated by a transmitter 28. In the "factory" example, the transmitter would be centrally located and designed to radiate a signal that would not extend substantially beyond the factory perimeter. The camera 10, including the receiver 30 (FIG. 2), will not operate if the signal from the transmitter 28 is not received.

Referring again to FIG. 5, the camera 10 is programmed to require reception of an operational code in order to function (block 82). The camera 10 is further programmed to check for a renewal of the operational code at periodic intervals of time A T, or at the occurrence of a specific initialization process such as when starting up the camera, or prior to taking a picture. If the renewal code is received 90, operation can continue. If the renewal operational code is not received 92, the camera according to the program, shuts down the camera operation (block 94). The owner can also optionally program a required user access password (block 82) for the purpose of deterring unauthorized use within the otherwise operational physical boundaries/zone. In operation, a user would enter his user access password (block 84) and operate the camera (block 86). The transmitter 28 repeatedly broadcasts the operational code. The camera checks for a renewal of the code transmission (block 88). If the camera 10 receives a renewal of the operational code (90), the camera continues to be operational. If no renewal of the code is received (92), the camera automatically shuts down operation (block 94).

Figure 6A:
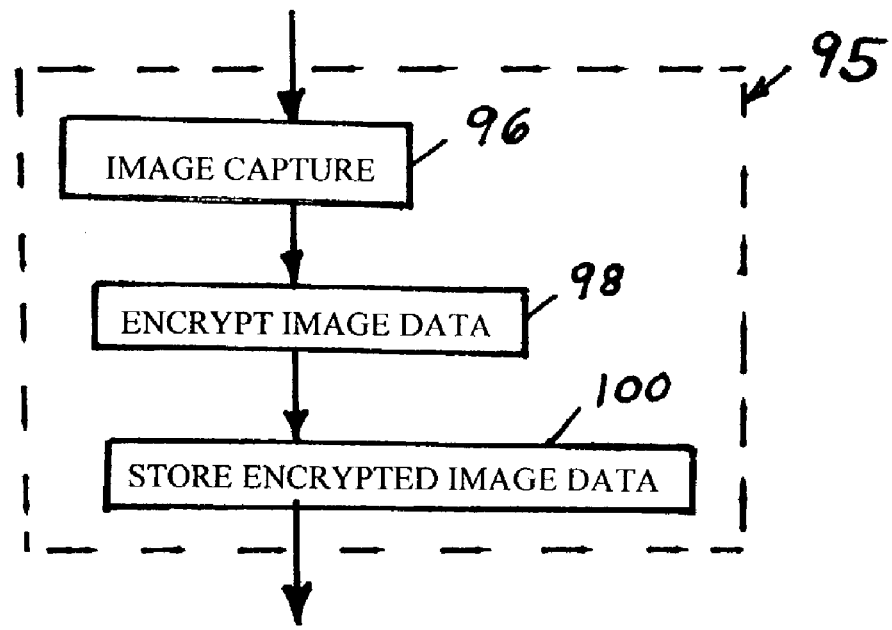
FIG. 6A is a flow chart showing further detail of the "operate camera" process of FIGS. 4 and 5.
Figure 6B:
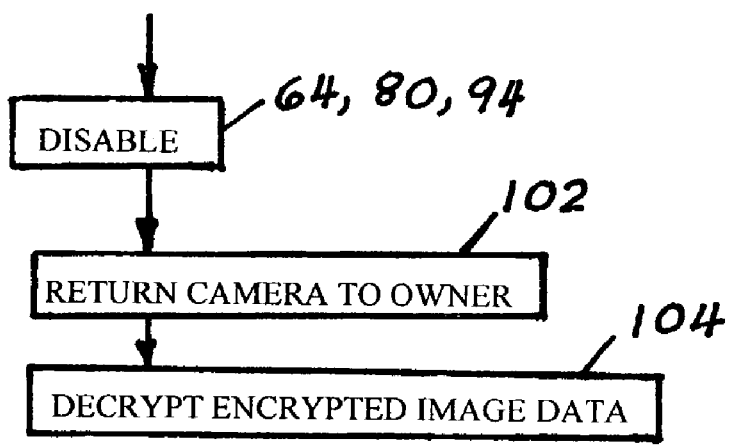
FIG. 6B is a flow chart illustrating the decryption process by an owner.

FIGS. 6A and 6B illustrate an alternate embodiment wherein an encryption procedure is performed on the image data, and then stored in the camera in an encrypted form. Only the owner has the key to decrypt the data, and as a result, a user is provided with an added incentive to return the camera in order to get a useable copy of the acquired image data.

Block 95 of FIG. 6A is a replacement for any of the "operator camera" blocks 56, 72, 86 of FIGS. 3, 4 and 5. According to FIG. 6A, in order to implement the encryption feature, the operate camera block 95 performs the process of image capture 96, followed by an encryption of the incoming image data 98, and then stores the encrypted image data 100. The camera then stores only the encrypted image data, the original then being available only to a person possessing a key, in this case the owner. A user must return the camera to the owner to get access to the original image data.

FIG. 6B illustrates the procedure of returning the camera, or camera and card to the owner. Following the camera disable (blocks 64, 80 or 94), the camera is returned to the owner (block 102). The owner then decrypts the encrypted image data and delivers it to the user (block 104).

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A digital camera system comprising:
 camera means including:
  image capture means for converting a light image to digital image data;
  computer means including:
   permit means for providing for first operation of said digital camera system based on an existing authorization and for determining a condition of expiration for revoking said existing authorization; and disabling means for, during the first operation, revoking the existing authorization and disabling a continued operation of said digital camera system responsive to said condition of expiration occurring, wherein disabling the continued operation includes preventing access to an available resource of the digital camera systen; and receiver means for receiving a radiated signal carrying an operational code; wherein said permit means includes means responsive to reception of said operational code to provide for the first operation, said computer means further includes means for checking if said operational code is received in a predetermined time interval, and said condition of expiration occurs when said operational code is not received in said time interval.

2. A digital camera system as recited in claim 1 wherein said condition of expiration occurs at a completion of a predetermined length of time.

3. A digital camera system as recited in claim 1 wherein said condition of expiration occurs at a completion of capture of a predetermined number of images.

4. A digital camera system as recited in claim 1 wherein said digital camera is a video camera and said condition of expiration occurs at the completion of a predetermined amount of recording time.

5. A digital camera system as recited in claim 1 wherein said computer means further includes card means programmed to implement said permit means; and card receptacle means.

6. A digital camera system as recited in claim 1, comprising transmitter means for radiating said signal carrying said operational code in said predetermined time interval.

7. A digital camera system as recited in claim 1 wherein said computer means further includes means for programming said condition of expiration of said first operation.

8. A digital camera system as recited in claim 1 wherein said computer means further includes first password means for requiring a user to enter a password to operate said camera means.

9. A digital camera system as recited in claim 1 wherein said computer means further includes means for programming said permit means and said disabling means.

10. A digital camera system as recited in claim 9 wherein said computer means further includes second password means for requiring entry of a password to access said means for programming.

11. A method of operation of a programmable digital camera comprising:

providing for first operation of said digital camera system based on an existing authorization;

receiving in the digital camera a radiated signal carrying an operational code;

checking if said operational code is received in a predetermined time interval for providing for the first operation;

determining a condition of expiration for revoking said existing authorization has occurred when said operational code is not received in said time interval;

providing for converting a light image to digital image data during the first operation; and revoking, during the first operation, the existing authorization and disabling a continued operation of said digital camera system responsive to said condition of expiration occurring, wherein disabling the continued operation includes preventing access to an available resource of the digital camera system.

12. A method as recited in claim 11 wherein said condition of expiration occurs at a completion of a predetermined length of time.

13. A method as recited in claim 11 wherein said condition of expiration occurs at a completion of capture of a predetermined number of images.

14. A method as recited in claim 11 wherein said digital camera is a video camera and said condition of expiration occurs at the completion of a predetermined amount of recording time.

15. A method as recited in claim 11 further comprising entering a first password to gain access to set said condition of expiration.

16. A method as recited in claim 11 further comprising entering a second password to enable said operation of said camera.

17. A digital camera system as recited in claim 1 wherein said digital image data is encrypted data, whereby a user can not view a likeness of said light image from said digital image data.

18. A digital camera system as recited in claim 17 further comprising decryption means for decrypting said encrypted data to form unencrypted digital image data whereby a user can view a likeness of said light image through use of said unencrypted digital image data.

19. A method as recited in claim 11 wherein said digital image data is encrypted data, whereby a user can not view a likeness of said light image from said digital image data.

20. A method as recited in claim 19 further comprising decryption means for decrypting said encrypted data to form unencrypted digital image data whereby a user can view a likeness of said light image through use of said unencrypted digital image data.

21. A digital camera system as recited in claim 1 wherein said computer means further includes display means for providing a visual indication of a state of said existing authorization.

22. A method as recited in claim 11 further comprising displaying a visual indication of a state of said existing authorization.

* * * * *

UNITED STATES PATENT AND TRADEMARK OFFICE
CERTIFICATE OF CORRECTION

| | | |
|---|---|---|
| PATENT NO. | : 7,324,133 B2 | Page 1 of 1 |
| APPLICATION NO. | : 10/346446 | |
| DATED | : January 29, 2008 | |
| INVENTOR(S) | : Eran Steinberg | |

It is certified that error appears in the above-identified patent and that said Letters Patent is hereby corrected as shown below:

In the Claims:

Column 5, line 10, "systen" should read --system--

Signed and Sealed this

Eighteenth Day of November, 2008

JON W. DUDAS
*Director of the United States Patent and Trademark Office*